(12) United States Patent
Douglas et al.

(10) Patent No.: US 10,750,323 B2
(45) Date of Patent: Aug. 18, 2020

(54) SYSTEMS AND METHODS FOR AUTOMATIC PATH MANAGEMENT

(71) Applicant: Capital One Services, LLC, McLean, VA (US)

(72) Inventors: Lawrence Douglas, McLean, VA (US); Thomas Christopher Clarke, Apex, NC (US); Deborah Nally, Williamsburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/004,805

(22) Filed: Jun. 11, 2018

(65) Prior Publication Data

US 2018/0290687 A1    Oct. 11, 2018

Related U.S. Application Data

(63) Continuation of application No. 15/197,076, filed on Jun. 29, 2016, now Pat. No. 10,034,137.

(Continued)

(51) Int. Cl.
*H04W 4/029* (2018.01)
*H04W 4/02* (2018.01)
*H04W 40/20* (2009.01)

(52) U.S. Cl.
CPC .......... *H04W 4/029* (2018.02); *H04W 4/023* (2013.01); *H04W 4/027* (2013.01); *H04W 40/20* (2013.01);

(Continued)

(58) Field of Classification Search
CPC .. G01C 21/206; G01C 21/3492; G01C 21/00; G01C 21/32; G08G 1/0104; G08G 1/01;
(Continued)

(56) References Cited

U.S. PATENT DOCUMENTS

2002/0167408 A1* 11/2002 Trajkovic ............... G06Q 30/06
                                                          340/573.1
2003/0009277 A1    1/2003 Fan
(Continued)

OTHER PUBLICATIONS

International Search Report and the Written Opinion of the International Searching Authority (PCT/US2016/040045) dated Sep. 14, 2016 (12 pages).

*Primary Examiner* — Quoc Thai N Vu
(74) *Attorney, Agent, or Firm* — Finnegan, Henderson, Farabow, Garrett & Dunner, LLP

(57) ABSTRACT

Methods and systems are provided for path management. Consistent with disclosed embodiments, path management system may be configured to perform a series of operations for real time path analysis. The embodiments may determine a user location based on received location data, and then determine a user path based on a sequence of user locations. The embodiments may calculate a path map based on user locations, and then determine one or more of a user density map and a user velocity map based on the path map. The embodiments may determine regions of the user density maps and user velocity maps, and provide instructions to one or more of an environment and a user device. The embodiments may provide guidance to a user of user of the path management system, and/or instructions to change a status of a service location; or modify a product layout or fixture arrangement.

20 Claims, 10 Drawing Sheets

Related U.S. Application Data

(60) Provisional application No. 62/187,078, filed on Jun. 30, 2015.

(52) U.S. Cl.
CPC .............. *Y02D 70/10* (2018.01); *Y02D 70/14* (2018.01); *Y02D 70/144* (2018.01); *Y02D 70/166* (2018.01); *Y02D 70/20* (2018.01); *Y02D 70/26* (2018.01); *Y02D 70/38* (2018.01)

(58) Field of Classification Search
CPC .. G08G 1/0112; G08G 1/0116; G08G 1/0133; H04W 40/20; H04W 4/023; H04W 4/027; H04W 4/028; H04W 4/029; H04W 64/006
See application file for complete search history.

(56) References Cited

U.S. PATENT DOCUMENTS

| | | |
|---|---|---|
| 2003/0163253 A1 | 8/2003 | Lee et al. |
| 2006/0173615 A1 | 8/2006 | Pinkus et al. |
| 2011/0109480 A1 | 5/2011 | Huijnen |
| 2013/0237204 A1* | 9/2013 | Buck ................ H04M 1/72569 455/418 |
| 2014/0188568 A1 | 7/2014 | Margolin |
| 2014/0235276 A1 | 8/2014 | Lefkowitz |
| 2015/0140982 A1* | 5/2015 | Postrel .................... H04W 4/12 455/418 |
| 2015/0260541 A1* | 9/2015 | Smith .................. G01C 21/206 701/439 |
| 2015/0292894 A1* | 10/2015 | Goddard ............ G01C 21/3453 701/400 |
| 2016/0345137 A1* | 11/2016 | Ruiz ....................... H04W 4/04 |

\* cited by examiner

SYSTEMS AND METHODS FOR AUTOMATIC PATH MANAGEMENT

PRIORITY CLAIM

This application is a continuation of U.S. patent application Ser. No. 15/197,076, filed on Jun. 29, 2016, which claims priority from U.S. Provisional Patent Application No. 62/187,078 filed on Jun. 30, 2015. The aforementioned applications are incorporated herein by reference in their entireties.

TECHNICAL FIELD

The disclosed embodiments generally relate to automatic generations of user path information based on detected user locations over time. More specifically, the disclosed embodiments relate to the use of Bluetooth Low Energy (BLE) tags or beacons to automatically generate user density and velocity maps for providing location-based services.

BACKGROUND

Automatic generation of user path information may benefit users and providers of location-based services. But current approaches to generating path information may not be able to provide real-time tracking of individual users. Instead, an environment may be provisioned with a static number of service locations and consistent staffing levels, regardless of user numbers or demands. In some situations, the number of service locations and the staffing level may be modified manually. For example, a teller may observe that checkout queues are long and customers are becoming dissatisfied, and broadcast a request for assistance. But such manual modification is imperfect, reactive, and based on limited knowledge about how users typically move, and are currently moving, through the environment. Automatic approaches may require expensive equipment, or lengthy installation and monitoring. These automatic approaches may be limited to simulations or trials, and may not be configured to provide information or services to users.

Currently, users may not be aware of underutilized queue or service locations, and may consequently select the slowest queue, or select a service location having long queues. This may delay the time to service and negatively affect the user's experience. Users traversing an environment may not be aware of the fastest path within the environment. For example, users may not be aware of the nearest exit in a facility, such as a movie theater or museum. Generally inconvenient, this lack of information may be dangerous in an emergency.

Consequently, there exists a need for systems and methods for automatic generation of user path information. These systems and methods may enable the provision of location-based services to users and to services providers.

SUMMARY

The disclosed embodiments may enable an automatic provision of location-based services to users and service providers. Service providers may use real-time path information to optimize the layout of an environment, or to modify the status of a queue or service location. For example, service providers may use real-time path information to identify underutilized or congested spaces in an environment, such as bottlenecks where user paths converge, or where user velocities decrease. As an additional example, service providers may modify an environment based on automatically gathered, real-time information about user paths. Service providers may modify queues disposed in an environment in response to real time path information. This modification may be based on current conditions and/or predicted future conditions. For example, the disclosed systems and methods may be configured to determine optimal staffing levels for service locations, potentially reducing the amount of time that users wait in queues. Automatic determination and modification of negative service location or queuing conditions may reduce time-lag, preventing overcompensation and wide swings in staffing levels and queue times. Automatic, real-time path information may also enable load sharing across multiple facilities or service locations by a service provider. For example, a service provider may be configured to indicate to a user a range of locations, together with expected service times. These indications may include paths from a start location to the service locations. The start location may be the current location of the user. By providing these indications the service provider may encourage users to visit underutilized service locations.

The disclosed embodiments may also provide location-based services to users. For example, automatically or in response to a user request, the disclosed embodiments may provide to a user a path to a desired product or service location. In emergency situations, the disclosed embodiments may route users, automatically or in response to a user request, to destinations, such as exits, along paths avoiding dangerous crowding or delays. The disclosed embodiments may also provide information about the expected time to reach a destination or perfect a service, such as the expected time in a queue before reaching a point-of-sale and/or completing a transaction at the point-of-sale.

The disclosed embodiments may include, for example, a computer-implemented method comprising operations performed using at least one processor. The operations may include determining a first location of a first user device based on received location data. The operations may further include determining a first user device path based on first user locations, the first user locations comprising the first location. The operations may also include calculating a path map based on user device paths, the user device paths comprising the first user device path. The operations may additionally include determining a user density map and a user velocity map based on the calculated path map.

In some embodiments, the received location data may indicate proximities of the first user device to one or more receivers and/or the received location data may indicate proximities of the first user device to one or more beacons. In certain embodiments, the received location data may be received from an application running on the first user device. In various embodiments, the first location may be determined based on antenna power levels and predetermined beacon locations.

In some embodiments, the operations may include determining one or more of a region of high user density, a region of low user density, a region of high user velocity, and a region of low user velocity based on the determined user density map and user velocity map. In various embodiments, the operations may include providing instructions to modify existing store conditions. In certain aspects, the instructions may include one or more of instructions to change a status of a point of service, instructions to change a status of a queue, and instructions to change a staffing level of at least part of a service location. In various aspects, the instructions to modify existing store conditions may include one or more of instructions to modify a product layout and instructions to modify a fixture arrangement. The operations may include determining a second path map upon implementation of the instructions to modify existing store conditions. In certain aspects, the first user device may be associated with a first customer segment. The path map may be associated with the first customer segment.

In some embodiments, the operations may include determining, based on the path map, one or more of a route and a service location. The operations may include providing, based on the path map, the one or more of the route and the service location to the first user device. In some aspects, the route may provide a reduced travel time from a start location to a finish location. The operations may include providing routes in response to an indication received from first user device. The routes may include the above-mentioned route. In certain aspects, the service location may include one or more of a point of sale, a queue, an access point, and a facility. The operations may include providing information concerning service locations in response to an indication received from a first user device. The service locations may include the above-mentioned service location. In some aspects, the information may include an estimated wait time.

The disclosed embodiments may include, as an additional example, a non-transitory computer-readable medium. This computer-readable medium may be configured to store instructions (e.g., computer code). When executed by the at least one processor, these instructions may cause the system to perform operations. These operations may include determining a first location of a first user device based on received location data. The operations may further include determining a first user device path based on first user locations. The first user locations may include the above-mentioned first location. The operations may include calculating a path map based on user device paths. The user device paths may include the above-mentioned first user device path. The operations may also include determining a user density map and a user velocity map based on the calculated path map.

In some embodiments, the received location data may indicate proximities of the first user device to one or more receivers and/or the received location data may indicate proximities of the first user device to one or more beacons. In certain aspects, the received location data is received from an application running on the first user device. The first location may be determined based on antenna power levels and predetermined beacon locations. In certain embodiments, the operations may include determining one or more of a region of high user density, a region of low user density, a region of high user velocity, and a region of low user velocity based on the determined user density map and user velocity map. In some embodiments, the operations may include providing instructions to change one or more of a status of a point of service, a status of a queue, a staffing level of at least part of a service location, a product layout, and a fixture arrangement. The operations may also include determining a second path map upon implementation of the instructions. In various embodiments, the operations may include determining one or more of a route and a service location based on the path map. The operations may also include providing the one or more of the route and the service location to the first user device.

The disclosed embodiments may include, as a further example, a path management system. The system may include one or more processors and at least one non-transitory memory storing instructions. When executed by the one or more processors, the instructions may cause the path management system to perform operations. The operations may include determining a first location of a first user device based on received location data, and determining a first user device path based on first user locations, the first user locations comprising the first location. The operations may also include calculating a path map based on user device paths, the user device paths comprising the first user device path, and determining a user density map and a user velocity map based on the calculated path map. The operations may further include determining one or more of a region of high user density, a region of low user density, a region of high user velocity, and a region of low user velocity based on the determined user density map and user velocity map. The operations may additional include providing instructions to change one or more of a status of a point of service, a status of a queue, a staffing level of at least part of a service location, a product layout, and a fixture arrangement. In some embodiments, the operations may include determining a second path map upon implementation of the instructions.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
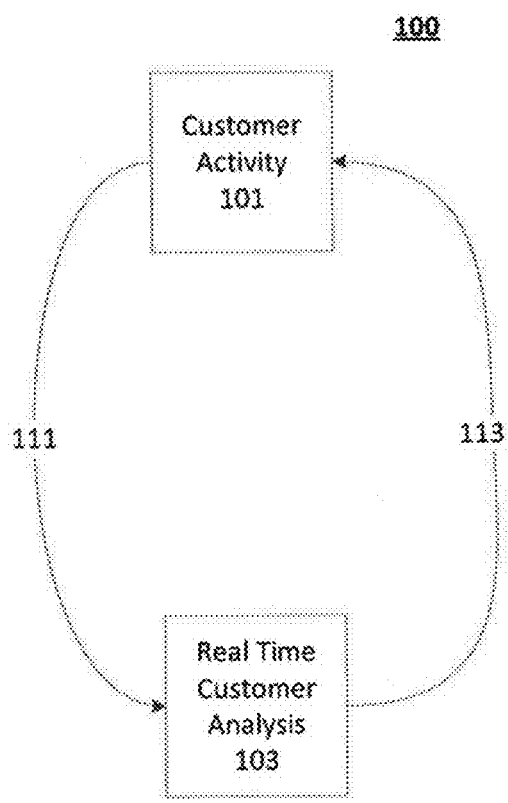
FIG. 1 depicts an exemplary method for path management.

FIG. 1 depicts an exemplary method for path management consistent with disclosed embodiments. In some embodiments, the method may comprise receiving user data 111 regarding user actions 101. User data 111 may comprise indications of the location of users with respect to one or more beacons or receivers. User data 111 may comprise indications of interactions between users and environments, such as a retail, travel, or employment environment. User analysis engine 103 may be configured to generate real-time, user-specific paths based on user data 11. User analysis engine 103 may be further configured to generate path maps aggregating the real-time, use-specific path information. In some embodiments, user analysis engine 103 may be configured to generate a user density path map, as described below with regard to FIG. 4A. In some embodiments, user analysis engine 103 may be configured to generate a user velocity path map, as described below with regard to FIG. 4B. In certain embodiments, user analysis engine 103 may be configured to provide modification instructions 113 for modifying the environment based in part on the user density map and the user velocity map. In some embodiments, user analysis engine 103 may be configured to receive additional user data 111 following implementation of the instructions. User analysis engine 103 may be configured to generate a second user density map based on this additional user data 111.

Consistent with disclosed embodiments, user actions 101 may include the movement of users in an environment, such as the movement of patrons in a mall, store, restaurant, concert hall, amusement park, or similar entertainment facility. As an additional example, user actions 101 may include the movement of commuters in an airport, at a depot, such as a train or bus depot, or on road network. As a further example, user actions 101 may include the movement of employees at a worksite, such as a warehouse or a hospital (e.g., medical personnel moving in an operating suite). In some aspects, user actions 101 may include interactions with elements of the space, taken by users, including interacting with elements of the space, such as viewing, handling, or purchasing items located within the space. In certain aspects, user actions 101 may include interactions with an application associated with the space, for example a merchant application associated with a store, a travel application associated with an airport, depot, or road network, or employment application associated with a worksite. Interactions may include requests for information about products, for routes between points in the space, and for locations. In some aspects, such locations may include access points for the space (e.g., entrances and exits, elevators, stairs, escalators) and service locations (e.g., point-of-sale terminals, service queues, facilities providing similar services).

Consistent with disclosed embodiments, user data 111 may include data or instructions corresponding to user actions 101. In some embodiments, user data 111 may indicate movements of users. For example, user data 111 may include indications of distances between a user device associated with the user and beacons and/or receivers. In certain embodiments, user data 111 may include user device coordinates. These user device coordinates may be derived from distances between a user device and beacons and/or receivers. In some aspects, the coordinates may be relative coordinates, measures with respect to an environment coordinate system. In certain aspects, the coordinates may be absolute coordinates, measured with respect to a geographical coordinate system. In certain embodiments, user data 111 may include data or instructions corresponding to interactions with elements of the space. For example, user data 111 may indicate that a user has viewed an item, such as a retail good or service. As an additional example, user data 111 may indicate that a user has handled an item, for example trying on an article of clothing. As an additional example, user data 111 may indicate that a user has purchased a good or service.

Consistent with disclosed embodiments, as described in detail below with respect to FIG. 2, user analysis engine 103 may comprise one or more servers or other types of computer devices configured to execute instructions stored in memory to perform one or more processes consistent with the disclosed embodiments. In some aspects, analysis engine 103 may be configured to determine paths corresponding to user devices based on user data 111. In certain aspects, analysis engine 103 may be configured to determine path maps based on aggregated paths corresponding to multiple user devices. In various aspects, analysis engine 103 may be configured to associate user data 111 with path maps. For example, analysis engine 103 may be configured to associate sales data for an item with path map information. Analysis engine 103 may be configured to generate modification instructions 113 based in part on the path maps.

Consistent with disclosed embodiments, analysis engine 103 may be configured to automatically generate modification instructions 113. In certain aspects, analysis engine 103 may be configured to automatically generate modification instructions 113 to change a status of a service location. For example, modification instructions 113 may comprise instructions to open or close a point of sale, such as a cash register; open or close a lane at a security screening, such as a TSA screening; open or close at least a part of a road, such as a lane; changing the direction of traffic for at least a part of a road (e.g., controlling the direction of traffic in a reversible lane); or similar modifications to a point of service apparent to one of skill in the art. In certain aspects, analysis engine 103 may be configured to automatically generate modification instructions 113 to change the status of a queue. For example, modification instructions 113 may comprise instructions to create or merge lines, such as checkout lines at a point of sale, or a security checkpoint, or a venue such as a concert, amusement park, club, restaurant, or similar line as would be appreciated by one of skill in the art. In certain embodiments, analysis engine 103 may be configured to automatically generate modification instructions 113 comprising instructions to change a staffing level of at least part of a service location. For example, modification instructions 113 may indicate that customer service representatives are needed at a specific part of a store, or that additional cashiers are needed at a point of sale.

Consistent with disclosed embodiments, analysis engine 103 may be configured to provide instructions 113. In some embodiments, analysis engine 103 may be configured to provide instructions 113 concerning a status of a service location or queue, or a staffing level of at least part of a service location. In various embodiments, analysis engine 103 may be configured to modification instructions 113 concerning an arrangement of fixtures. For example, as would be recognized by one of skill in the art, an arrangement of fixtures (e.g., display cases, slatwall, gridwall, shelving, display tables, display counters, gondolas, wall displays, cashwraps or points of sale or purchase) may increase or decrease product sales. In various embodiments, analysis engine 103 may be configured to provide instructions 113 to modify a layout of products in the store. For example, as would be recognized by one of skill in the art, a layout of product may be governed by planograms, or similar diagrams showing the appropriate arrangement and display of products on store fixtures. Instruction 113 may comprise instructions to modify one or more aspects of a planogram, such as the location of a product on a shelf, or the composition of products on a shelf. In some embodiments, instructions may comprise guidance to a user of path management system 200. Such guidance may be provided automatically, or may be provided in response to a request received by analysis engine 103. In some examples, user guidance may include one or more of a route, product, product category, and service location information. For example, upon request analysis engine 103 may be configured to provide a route from a current user location to a requested product, access point (such as an entrance, exit, escalator, elevator, or similar access point), and service location.

Figure 2:
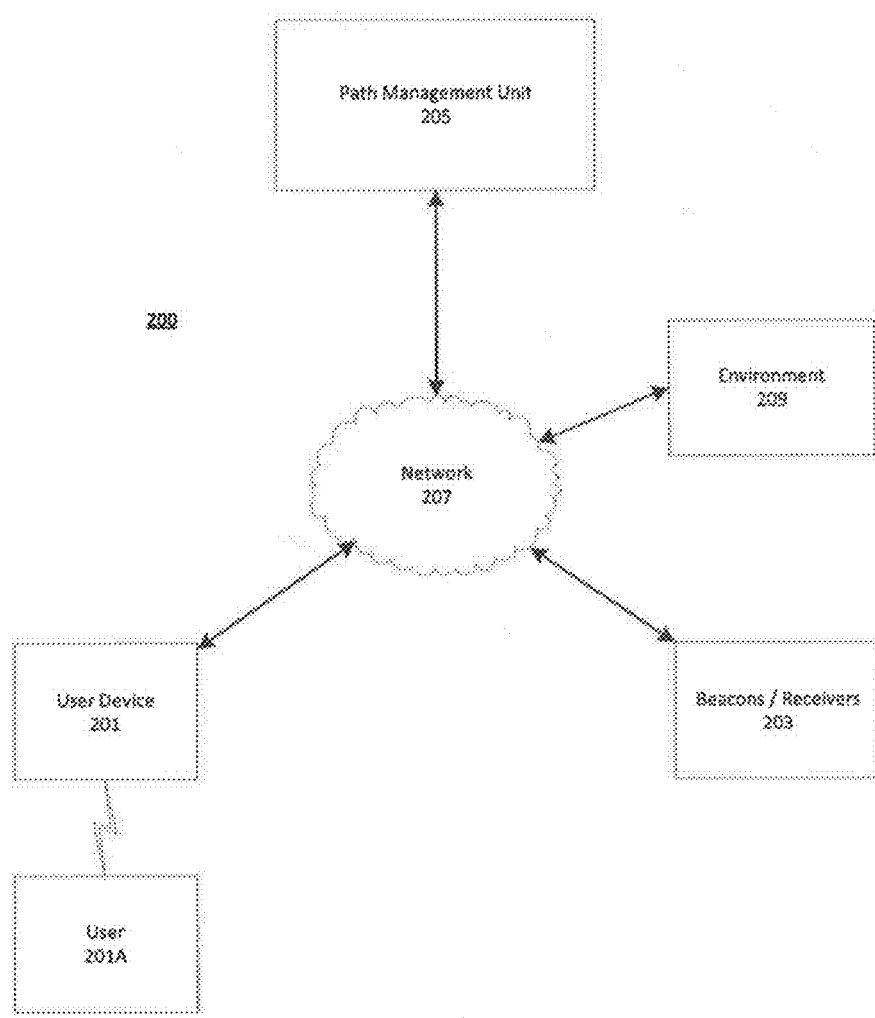
FIG. 2 depicts a schematic illustrating an exemplary system for path management.

FIG. 2 depicts a schematic illustrating an exemplary system for path management 200 consistent with disclosed embodiments. In some embodiments, the components of path management system 200 are configured to exchange data and instructions to realize the operations discussed above with respect to FIG. 1. In certain aspects user device 201 may be configured to interact with beacons/receivers 203 to generate user data 111. In various aspects, one or more of user device 201 and beacons/receivers 203 may be configured to provide user data 111 over network 207. In some aspects, path management system 205 may be configured to receive user data 111 from one or more of user device 201 and beacons/receivers 203. In certain embodiments, path management system 205 may be configured to determine locations for users based on the user data 111. In certain aspects, user data 111 may comprise locations for users. In some embodiments, path management unit 205 may be configured to determine paths for users based on locations for users. In certain aspects, path management unit 205 may be configured to determine one or more path maps. The path maps may indicate collective behavior of users based on aggregated path data for users. Path management unit 205 may be configured to determine one or more of path maps indicating user density and path maps indicating user velocity.

In certain embodiments, path management unit 205 may be configured to receive requests from user 201A through first user device 201. The request may be received over network 207. Based on the path maps, path management unit 205 may be configured to determine one or more routes and service locations in response to the request. In some embodiments, path management unit 205 may be configured to provide one or more of route information concerning the routes and service location information concerning the service locations. In certain aspects, path management unit 205 may be configured to provide the one or more of the route information and the service location information to user device 201.

In some embodiments, as described above, path management unit 205 may be configured to generate instructions 113 based on user data 111. In certain embodiments, path management unit 205 may be configured to generate instructions 113. In certain embodiments, as described above, path management unit 205 may be configured to provide instructions 113 to environment 209. In some aspects, path management unit 205 may be configured to provide instructions 113 over network 207. In some embodiments, instructions 113 may comprise one or more instructions concerning a status of a service location or queue, or a staffing level of at least part of a service location. In various embodiments, path management unit 205 may be configured to provide instructions 113 concerning an arrangement of fixtures. As would be recognized by one of skill in the art, environment 209 may be modified based on instructions 113 provided by path management system. Embodiments of the present disclosure are not intended to be limited by the method of implementing instructions 113. In certain aspects, path management unit 205 may be configured to determine a second one or more path maps following implementation of instructions 113 by environment 209.

Consistent with disclosed embodiments, user device 201 may be configured to provide information to other components of dataset processing system 200. In some aspects, user 201A may operate user device 201, or direct operation of user device 201. User device 201 may include, but is not limited to include a consumer electronics device such as a smartphone, tablet, netbook, electronic reader, wearable display (e.g., electronic glasses), smart watch, personal digital assistant, personal computer, laptop computer, tracking device (e.g., Bluetooth tag), and/or other types of electronics or communication devices. A non-limiting example of such a computing device is provided below in FIG. 8. In some embodiments, customer device 201 may be configured to execute a customer assistance application. In certain aspects customer assistance application may be configured to interact with one or more of path management unit 205, environment 209, and beacons/receivers 203. For example, customer assistance application may be configured to request information concerning service locations and routes. As an additional example, customer assistance application may be configured to communicate with sensor 214. In some embodiments, customer assistance application may be configured to facilitate or perform transactions (e.g., the selection and purchase of one or more merchandise items). In some embodiments, customer device 201 may be configured to enable customer 201A to access inventory and other merchandise information from one or more of path management unit 205 and environment 209. In certain embodiments, customer device 201 may be configured to enable customer 201A to register with environment 209. In some embodiments, registration may comprise establishing or asserting an identity of user 201A with environment 209.

User 201A may operate user device 201 to communicate with one or more components of path management system 200, consistent with disclosed embodiments. In some embodiments, user 201A may use user device 201 while navigating environment 209. For example, when environment 209 is a retail environment, such as a store or a mall, user 201A may communicate with one or more components of path management system 200 while shopping for merchandise items. As an additional example, when environment 209 is a worksite environment, such as a warehouse or hospital, user 201A may communicate with one or more components of path management system 200 while performing employment duties. In some embodiments, user 201 may communicate with one or more components of path management system 200 to request information regarding routes and/or service locations.

Beacons/Receivers 203 may be configured to interact with one or more components of path management system 200. In some embodiments, beacons/receivers 203 may be configured to interact with user device 201. For example, beacons/receivers 203 may be configured to detect the presence of and/or communicate with a proximate user device 201. In some aspects, beacons/receivers 203 may comprise one or more beacons, such as Bluetooth low energy beacons, radio frequency identification (RFID) tags, wireless transmitters and/or any other type of transmitter configured to provide a signal for detection by user device 201. In various aspects, beacons/receivers 203 may comprise one or more receivers, such as Bluetooth low energy devices, radio frequency identification (RFID) receivers, wireless receivers and/or any other type of receiver configured to receive a signal provided by user device 201. Path management system 200 may be configured based on the assumption that the location of user device 201 indicates the location of user 201A.

In some exemplary embodiments, beacons/receivers 203 may include one or more processor(s) configured to access data and/or execute software instructions stored in memory to perform one or more processes consistent with the disclosed embodiments. In some exemplary embodiments, beacons/receivers 203 may be located entirely or partially within environment 209. Consistent with disclosed embodiments, one or more of beacons/receivers 203, environment 209, and path management system 205 may be managed by a common entity. For example, path management system 205 and beacons/receivers 203 may comprise aspects of a computer system of a legal entity (not shown). In some embodiments, an additional third party entity may manage one or more of beacons/receivers 203, environment 209, and path management system 205. For example, a merchant may operate environment 209, while path management system 205 and beacons/receivers 203 may be managed by a third party to the merchant, such as a third-party contractor.

In some embodiments, a sensor identifier may be associated with each of beacons/receivers 203. In certain aspects, these sensor identifiers may comprise numeric or alphanumeric strings. Components of path management system 200 may be configured to use sensor identifiers to locate user device 201. In some exemplary embodiments, a sensor identifier may be a Bluetooth identifier corresponding to sensor 214. In other exemplary embodiments, sensor identifier may include a Bluetooth profile associated with sensors 214. In yet other exemplary embodiments, one or more sensor identifiers may include a coordinate position of one or more of beacons/receivers 203. In some aspects, this coordinate position may be relative to an origin disposed within environment 209. For example, the origin may correspond to a service location within environment 209, such as a point of service, an access point, or a subdivision of environment 209, such as a department of a store, a unit of a hospital, or a manufacturing or loading bay of a worksite, such as a factory or warehouse.

Consistent with disclosed embodiments, path management unit 205 may be configured to interact with one or more of the components of path management system 200. In some embodiments, path management unit 205 may include one or more servers or other type of computer devices configured to execute software instructions stored in memory to perform one or more processes consistent with the disclosed embodiments. For example, path management unit 205 may include one or more memory device(s) storing data and software instructions and one or more processor(s) configured to use the data and execute the software instructions to perform server-based functions and operations known to those skilled in the art. Path management unit 205 may be standalone, or it may be part of a subsystem, which may be part of a larger system. For example, path management unit 205 may represent distributed servers that are remotely located and communicate over a network (e.g., network 207) or a dedicated network, such as a LAN. In certain aspects, path management unit 205 may include one or more web servers that execute software that generates, maintains, and provides web site(s) accessible over network 207 for an entity associated with one or more components of path management system 200.

Consistent with disclosed embodiments, path management unit 205 may comprise one or more databases (not shown). The one or more databases may be configured as logically and/or physically separate databases. The one or more databases may be configured to store data. In some embodiments, the data stored in the databases may be received from one or more of path management unit 205, from beacons/receivers 203, from user device 201, and environment 209. In some embodiments, the one or more databases may store data provided as input using conventional methods (e.g., data entry, data transfer, data uploading, etc.). The databases may be configured to store data concerning one or more of user 201A, beacons/receivers 203, sensor identifiers, and items in environment 209. In some embodiments, data concerning user 201A may comprise one or more of a user profile, user credentials, user credit history, user transaction history, and financial information related to one or more financial accounts, and/or other financial data associated with user 201A. In various aspects, data concerning items in environment 209 may comprise inventory data indicating a number of items available in environment 209. In some aspects, data concerning items in environment 209 may comprise location data indicating a location of one or more of the items within environment 209. Additionally or alternatively, the data stored in the database may take or represent various forms including, but not limited to, documents, presentations, spreadsheets, textual content, mapping and geographic information, rating and review information, pricing information, address information, profile information, information regarding sensor 214 or merchandise items 104, audio files, video files, and a variety of other electronic data, or any combination thereof.

In some embodiments, path management unit 205 may be configured to determine one or more path maps corresponding to environment 209. The path maps may comprise data and/or instructions stored in a non-transitory memory. In certain aspects, the one or more path maps may be based on paths associated with user devices. For example, in some embodiments, path management unit 205 may be configured to determine paths based on sequences of user locations determined for user devices, such as user device 201. In certain aspects, path management unit 205 may be configured to determine user locations for user devices based on user data 11 received from user devices. For example, path management unit 205 may be configured to determine user locations for user devices, such as user device 201, based on distance information received from the user devices. In some embodiments, path determination may require interpolation of user device trajectories between points. For example, beacons may be configured to broadcast sensor identifiers once a second. A rapidly walking user may transport a user device six or more feet between identifier broadcasts. Similarly, a vehicle may transport a user device tens of feet in a second, for example a car on a highway traveling 100 miles per hour may transport a user device 100 feet in a second. Therefore, path management unit 205 may be configured to interpolate between identified locations to generate a path. A collection of paths for users may determine a path map.

Path management unit 205 may be configured to associate paths with metadata, consistent with disclosed embodiments. In certain aspects, paths may be associated with data concerning user 201A. In various aspects, paths may be anonymized. In some aspects, paths may be associated with sales data. For example, paths may be associated with items. For example, path management device 205 may be configured to associate paths with indications of items viewed or purchased by the user associated with the tracked user device. In some embodiments, path management unit 205 may be configured to generate and provide path maps using paths associated with one or more of products, product categories, financial transaction categories (e.g., method of payment, amount of purchase, returns), and users with selected demographic characteristics.

Consistent with disclosed embodiments, network 207 may enable the components of path management system 200 to communicate. In some embodiments, network 207 may include any combination of communications networks. For example, network 207 may include the Internet and/or any type of wide area network, an intranet, a metropolitan area network, a local area network (LAN), a wireless network, a cellular communications network, a Bluetooth network, a radio network, a near field network, or any other type of electronics communications network know to one of skill in the art. For example, beacons/receivers 203 may be configured to signal user device 201 over a Bluetooth network. As an additional example, user device 201 may be configured to provide user data 111 over a cellular network, at least in part, to path management unit 205.

Consistent with disclosed embodiments, environment 209 may be configured to communicate with one or more components of path management system 200. In some embodiments, environment 209 may comprise a retail or wholesale environment, a transportation environment, a public sector environment, or some other environment suitable for tracking user locations to generate aggregate user path information. For example, environment 209 may comprise a store, mall, shopping center, or warehouse. As an additional example, environment 209 may comprise a train station, bus depot, or an airport. As a further example, environment 209 may comprise a hospital or a prison. In some embodiments, environment 209 may comprise fixtures, as disclosed above. In certain embodiments, beacons/receivers 203 may be disposed all or partially within environment 209. In some embodiments, environment 209 may be configured to receive instructions 113 from path management system 205. For example, as disclosed above, environment 209 may be configured to receive instructions to change a status of a service location, modify an arrangement of fixtures, or modify a layout of products in environment 209. As would be recognized by one of skill in the art, numerous methods of receiving and implementing instructions 113 may be contemplated, and the envisioned embodiments are not intended to be limited to a particular method.

As would be recognized by one or ordinary skill in the art, the components and arrangement of the components included in path management system 200 may vary. Thus path management system 200 may comprise additional or alternative components to perform processes consistent with the disclosed embodiments. Furthermore, path management system 200 may include any number of user devices 201, beacons/receivers 203, path management units 205, networks 207, and environments 209, consistent with the disclosed systems and methods. In addition, operations attributed to particular components of system 200 may be distributed amongst other components of system 200, consistent with disclosed embodiments.

Figure 3A:
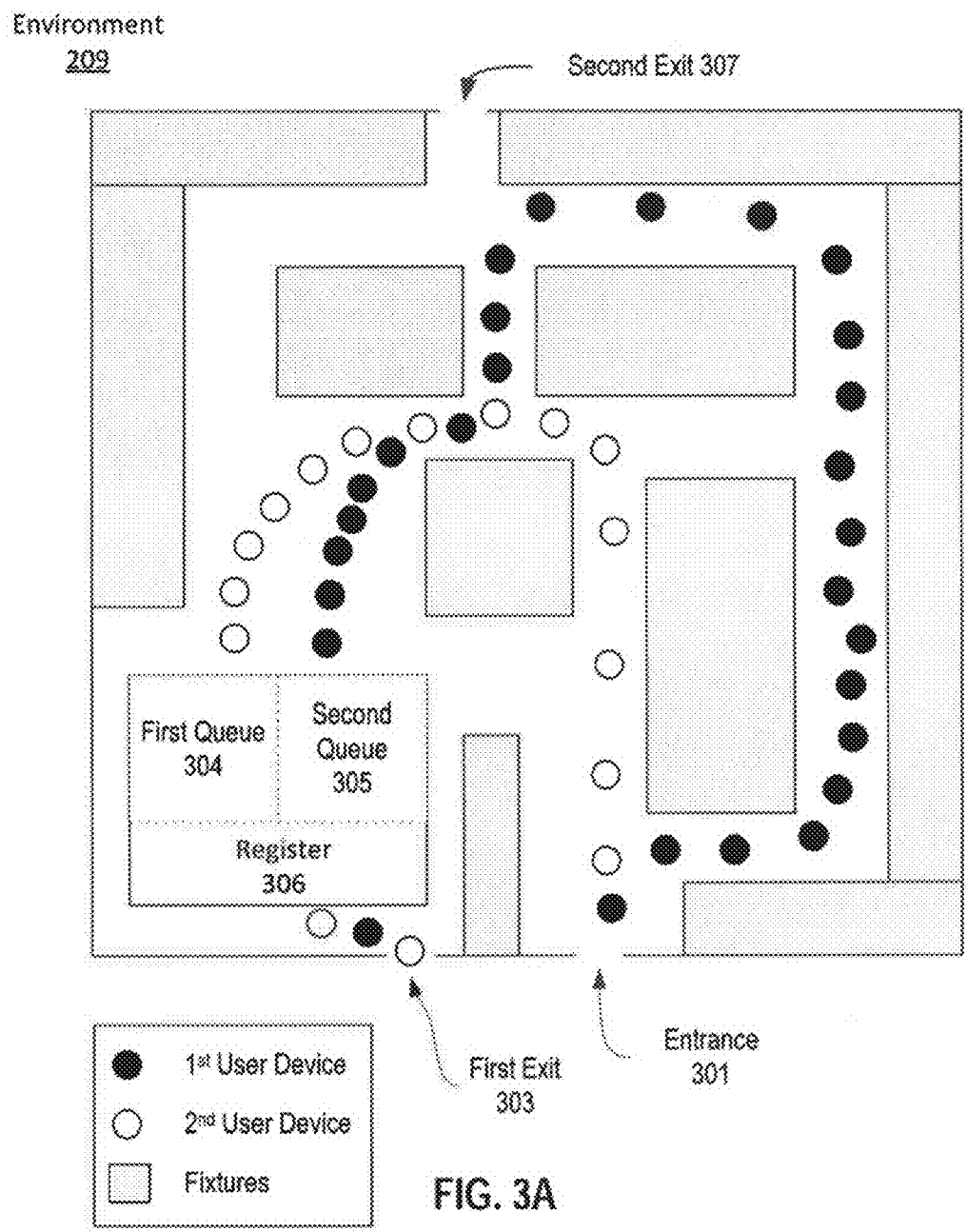
FIG. 3A depicts exemplary user device paths.

FIG. 3A depicts exemplary user device paths consistent with disclosed embodiments. The depicted first user device path (filled circles), and the second user device path (open circles), are disposed within an exemplary environment 209. This non-limiting exemplary environment 209 comprises a retail store. But one of skill in the art would recognize the applicability of the systems and methods disclosed herein to other environments. In certain aspects, environment 209 comprises fixtures, as described above. These fixtures may define aisles through which users (not shown) may transport the first and second user devices. In certain aspects, environment 209 may comprise components, such as one or more of entrance 301, first exit 303, first queue 304, second queue 305, point of service 306, and second exit 307. As would be recognized by one of skill in the art, the components of environment 209 are disclosed herein to illustrate the capabilities of the envisioned embodiments. The envisioned embodiments are not intended to be limited to environments comprises such components.

Consistent with disclosed embodiments, as depicted in FIG. 3A, environment 209 may comprise service locations (e.g., service location 306). Service location 306 may comprise a point of sale, such as a register, one or more queues, such as first queue 304 and second queue 305, an access point, such as entrance 301, first exit 303, and second exit 307, a facility, such as a department within a store, a store or restaurant within a mall, a musical performance within a venue, a unit within a hospital, a bay within a factory, a security checkpoint within an in airport or depot, or other location at which a user may receive or provide a good or service. For example, service locations may include entrance 301, first exit 303, and second exit 307. These service locations may comprise access points for environment 209. As would be recognized by one of skill in the art, these access points may have any suitable configuration that enables users to enter and exit environment 209. Similarly, in certain aspects, environment 209 may comprise service locations first queue 304 and second queue 305. In some aspects, first queue 304 and second queue 305 may comprise collections of users waiting for one or more goods or services. In some embodiments, one or more of first queue 304 and second queue 305 may comprise users physically arranged in a specific line or sequence. In certain arrangements, one or more of first queue 304 and second queue 305 may comprise a virtual queue. For example, users may receive an indication of priority, such as a number, and may be served according to that indicated priority. Consistent with disclosed embodiments, an expected wait time may be associated with each of first queue 304 and second queue 305. In certain aspects, environment 209 may comprise points of sale, such as register 306. Register 306 may comprise a cash register, a card reader, or any other fixed or mobile device for conducting a financial transaction known to one of skill in the art.

As depicted in FIG. 3A, a first user device and a second user device (associated with a first user and a second user, respectively) are transported through environment 209. Consistent with disclosed embodiments, path management system 200 may be configured to acquire a time series of user device locations corresponding to each of first user device and second user device. As shown, path management system 200 may be configured to periodically detect the location of one or more of the first user device and second user device. For example, one or more of user device 201, path management unit 205, or environment 209 may be configured to periodically determine the location of first user device. In some aspects, this detection may occur periodically. In certain aspects, this detection may occur aperiodically. For example, path management system 200 may be configured to generate user data comprising tuples of user device locations and times. In the non-limiting example shown in FIG. 3A, first user device and second user device are transported into environment 209 through entrance 301, through environment 301 to one of first queue 304 and second queue 305 at register 306, and then out of environment 301 through first exit 303. In this non-limiting example, the first user device is slowly transported to right upon entering environment 209, and then to the second queue 305. In contrast, the second user device is quickly transported to the center of environment 209 and then to first queue 304.

The times series of user device locations depicted in FIG. 3A may correspond to two users: a first user that enters a store, turns right, and proceeds slowly along the perimeter of the store until reaching an exit without a register (second exit 307), and turns back into the center of the store in search of a register (register 306); and a second user that rushes into the center of a store to retrieve a specific item and then goes to a register to exit (register 306). Based on such behavior, path management system 201 may be configured to provide instructions 113 to environment 209 or one of the user devices.

Figure 3B:
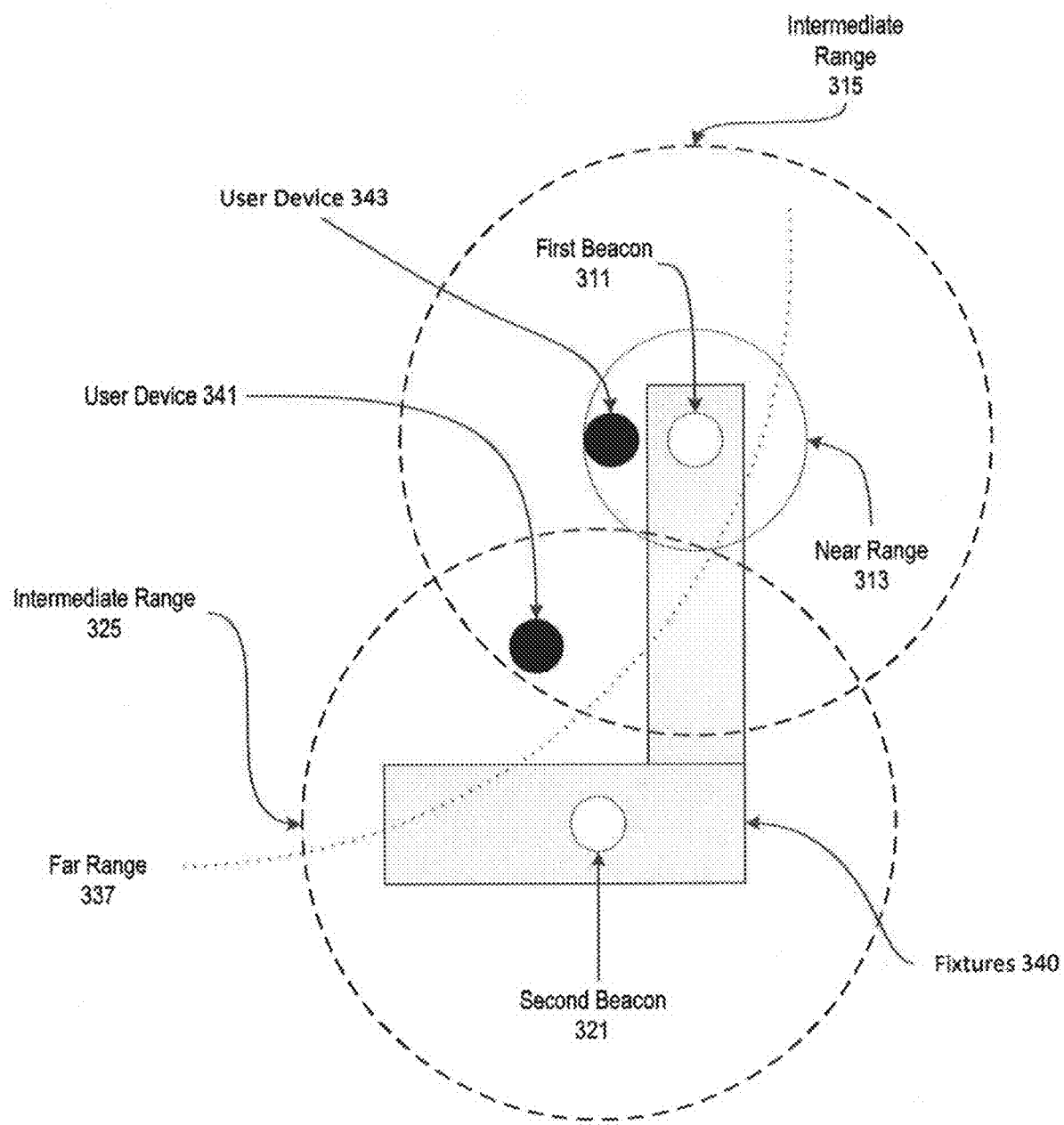
FIG. 3B depicts determination of a user device location from received location data.

FIG. 3B depicts determination of a user device location from received location data consistent with disclosed embodiments. This non-limiting example concerns three beacons (two shown) and two user devices. In this non-limiting example, the beacons are mounted on fixtures 340 for clarity. One of skill in the art would appreciate that the beacons could be mounted elsewhere. As a non-limiting example, the beacons could also be mounted on a ceiling or overhead suspension mechanism. Each beacon may be configured to periodically transmit signals, as described above, such as BLE signals. Each user device may be configured to receive these transmitted signals. In some embodiments, each device may be configured to estimate a distance between the device and each beacon based on the transmitted signals. For example, the received signals may vary in strength depending on a distance between a user device and a beacon. The user device may be configured to estimate a distance between the user device and the beacon based on this signal strength. In certain embodiments, the user device may be configured to indicate discrete categories of signal strength. For example, a user device (e.g., user device 343) may be configured to indicate a first category of signal strength when the user device is within a near range (e.g., near range 313) of a beacon (e.g., first beacon 311). Similarly, a user device (e.g., user device 341) may be configured to indicate a second category of signal strength when the user device is within an intermediate range (e.g., intermediate range 315) of a beacon (e.g., first beacon 311). Furthermore, a user device (e.g., user device 343) may be configured to indicate a third category of signal strength when the user device is within a far range (e.g., far range 337) of a beacon. Each user device may simultaneously be receiving signals from multiple beacons. For example, user device 341 is within far range 337 of one beacon (not shown), intermediate range 315 of second beacon 321, and intermediate range 315 of first beacon 311. As an additional example, user device 343 is within far range 337 of one beacon (not shown), intermediate range 315 of second beacon 321, and near range 313 of first beacon 311. In some embodiments, the far range may be 30 to 100 or more feet, intermediate may be 3 to 30 feet, and near may be less than 3 feet. Alternatively or additionally, a user device may estimate a received signal strength indication, as would be understood by one of skill in the art.

Consistent with disclosed embodiments, in this non-limiting example, path management unit 205 may be configured to calculate distances between user device 201 and the first beacon 311, second beacon 313, and third beacon (not shown). In some embodiments, path management unit 205 may be configured to calculate distances based on a signal indicator associated with the beacon (as described above) and one or more of the range category and received signal strength indication. In certain embodiments path management unit 205 may be configured to receive signal indicators and one or more of the range category and received signal strength indication from user device 201. Alternatively or additionally, in some embodiments, path management unit 205 may be configured to receive distances calculated by first user device 201 based on one or more of the range category and received signal strength indication. While this non-limiting example has depicted the user device as a receiver interacting with beacons, one or ordinary skill in the art would recognize that user device may also act as a broadcaster. In such embodiments, receivers would replace the beacons depicted in FIG. 3A. Each receiver would determine one or more of a range category and received signal strength indication for the signals broadcast by the first user device and second user device. This range category and received signal strength indication would be provided to path management unit 205. For example, the receivers may be configured to provide this information to path management unit 205 over network 207. Path management unit 205 would be configured to determine locations for the first user device and second user device.

Figure 4A:
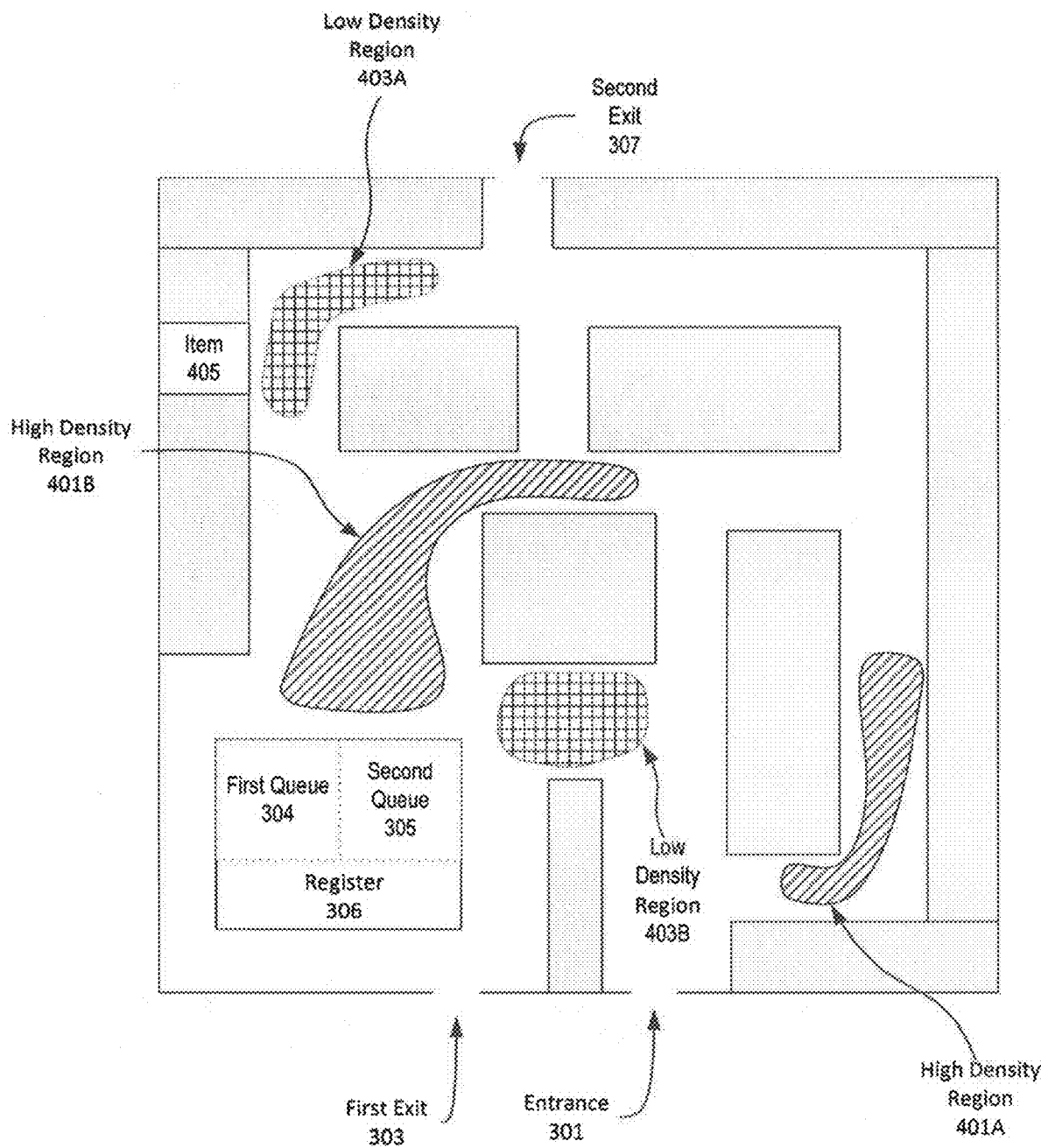
FIG. 4A depicts an exemplary path map showing user density regions.

FIG. 4A depicts an exemplary user density map showing density regions consistent with disclosed embodiments. In some embodiments, path management unit 205 may be configured to calculate user density maps for environment 209. The user density maps may comprise data and/or instructions stored in a non-transitory memory. In some aspects, user density maps may indicate a spatial user density for environment 209. As described in greater detail below, path management system 200 may be configured to generate density maps to inform proper configuration of environment 209. For example, environment 209 may not be properly configured to encourage users to traverse all of environment 209. At the same time, environment 209 may be configured to channel users into high density regions, reducing user satisfaction.

Path management unit 205 may be configured to create a discretized representation of environment 209, consistent with disclosed embodiments. In some aspects, the discretized representation may comprise discrete elements, each discrete element having a density count. This density count may comprise a count of user paths traversing the discrete element. For example, path management unit 205 may be configured to partition a representation of environment 209 into a grid of discrete elements. In some aspects, path management unit 205 may be configured to assign a density value to each element in the grid based on the density count. The density value may be an unscaled value or a scaled value. The density value may be a normalized value, for example the density count normalized by the maximum, minimum, range, average, or median density count for the elements of the grid. In some embodiments, path management unit 205 may be configured to determine a change in densities between a first path map and a second path map.

As depicted in exemplary FIG. 4A, a user density maps may indicate regions of high user density, for example high density region 401A and 401B. High density regions may be defined with respect to historical densities or current user locations. Historical densities may include maximum densities over a time interval, average densities over a time interval, or some other measure of typical density known to one of skill in the art. High density regions may be defined statistically or with respect to a predetermined threshold. A definition of high density regions may be particular to environment 209, or independent of any particular environment. For example, high density regions may be defined with respect to a percentile, such at a 75%, 80% or 90% percentile of user densities for a user density map of environment 209. As an additional example, high density regions may be defined with respect to an average user density and a standard deviation of user densities, such as a user density more than one standard deviation greater than the average user density. As a further non-limiting example, a region of high time-averaged density may comprise discrete elements having greater than 0.5 paths per square meter, and/or a region of high instantaneous density value may comprise discrete elements having greater than 1.5 paths per square meter. Particular threshold values may depend on environment 209 and the examples provided are not intended to be limiting. As shown in FIG. 4A, high density regions may be associated with user behaviors, such as, in non-limiting examples, turning right upon entering a store (e.g., high density region 401A), or a junction of common user pathways (e.g., high density region 401B).

As further depicted in exemplary FIG. 4A, user density maps may indicate regions of low user density, for example low density region 403A and 403B. Low density regions may be defined with respect to historical densities or current user locations. Historical densities may include maximum densities over a time interval, average densities over a time interval, or some other measure of typical density known to one of skill in the art. Low density regions may be defined statistically or with respect to a predetermined threshold. A definition of low density regions may be particular to environment 209, or independent of any particular environment. For example, low density regions may be defined with respect to a percentile, such as the 25%, 20% or 10% percentile of user densities for a user density map of environment 209. As an additional example, low density regions may be defined with respect to an average user density and a standard deviation of user densities, such as a user density less than one standard deviation less than the average user density. As a further non-limiting example, a region of low user density may comprise discrete elements having time-averaged density less than 0.05 paths per square meter (i.e., a region traversed by a single user per square meter every 20 units of time), and/or a region of low density may comprise discrete elements having instantaneous density values less than 0.1 paths per square meter (i.e., a region of 10 square meters containing a single user). Particular threshold values may depend on environment 209 and the examples provided are not intended to be limiting. As shown in FIG. 4A, low density regions may be associated with user behaviors, such as, in non-limiting examples, avoidance of out-of-the way corners of a store (e.g., low density region 403A), or avoidance of apparent dead-ends (e.g., low density region 403B). This avoidance may negatively impact item sales, such as sales of item 405.

User density maps may be associated with metadata, consistent with disclosed embodiments. In some embodiments, path management unit 205 may be configured to generate and provide user density maps based on path maps for certain selections of one or more of products, product categories, financial transaction categories (e.g., method of payment, amount of purchase, returns), and users with selected demographic characteristics. As a non-limiting example, a user density map may indicate the density of users in environment 209 that purchased more than $100 worth of products, or the density of 18-to-34-year-old users in environment 209. In some embodiments, path management unit 205 may be configured to provide user density maps as heatmaps for display on an electronic display associated with one or more of user device 201, path management unit 205, and environment 209.

Figure 4B:
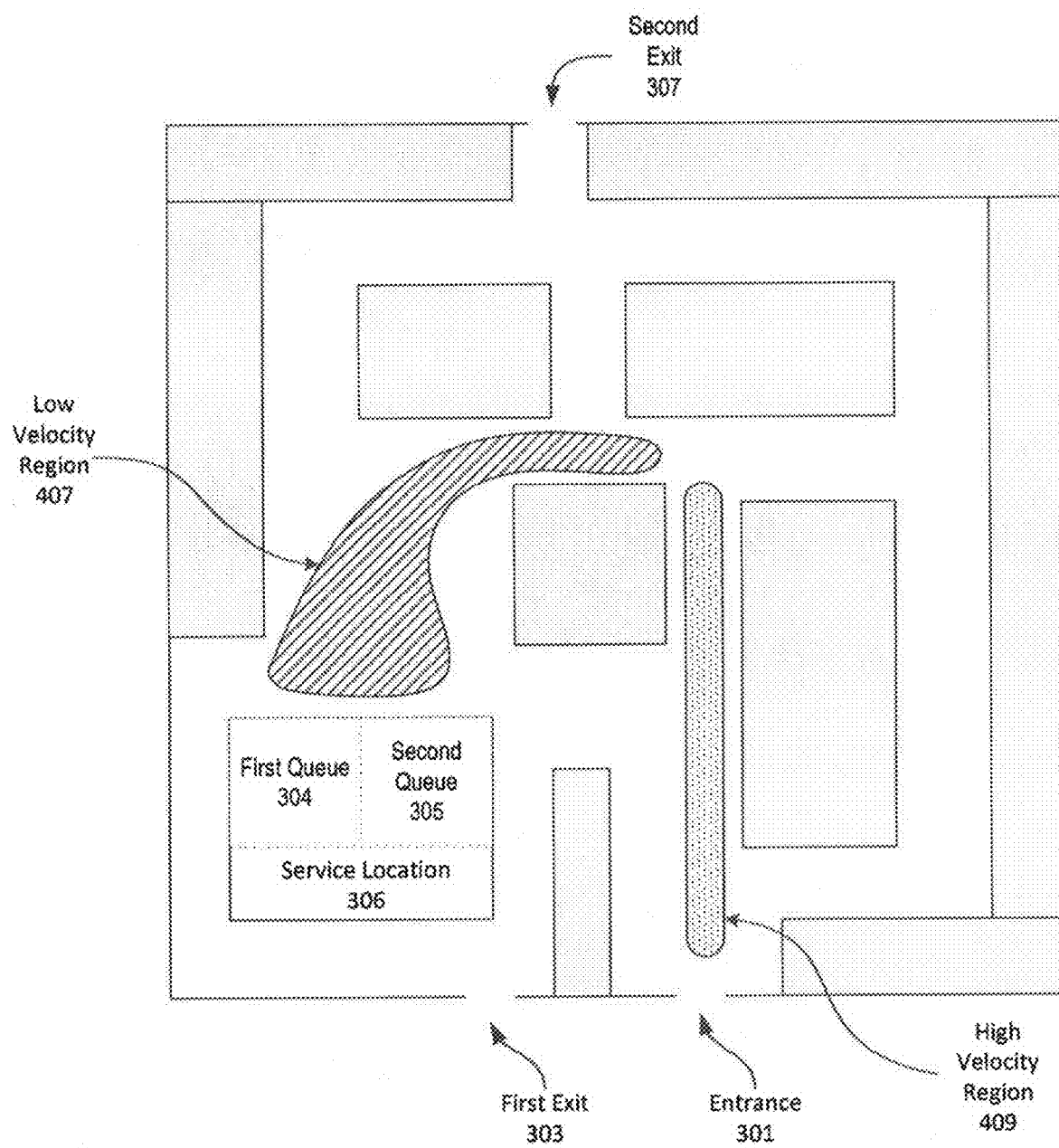
FIG. 4B depicts an exemplary path map showing user velocity regions.

FIG. 4B depicts an exemplary user velocity map showing velocity regions consistent with disclosed embodiments. In some embodiments, path management unit 205 may be configured to calculate user velocity maps for environment 209. The user velocity maps may comprise data and/or instructions stored in a non-transitory memory. In some aspects, user velocity maps may indicate a user velocity field for environment 209. As described in greater detail below, path management system 200 may be configured to generate velocity maps to inform proper configuration of environment 209. For example, environment 209 may be improperly configured to encourage users to traverse portions of environment 209 at excessive speeds. At the same time, environment 209 may be improperly configured to channel users into regions of low velocity, reducing user satisfaction.

As described above, path management unit 205 may be configured to create a discretized representation of environment 209, consistent with disclosed embodiments. In some aspects, the discretized representation may comprise discrete elements, each discrete element having an average velocity. This average velocity may depend on the velocities of user paths traversing the discrete element. For example, a velocity may be defined for each path traversing the discrete element. In some aspects, the average velocity may comprise the vector sum these velocities divided by the number of paths. In certain aspects, the average velocity may comprise the normalized vector sum of these normalized versions of these velocities (i.e., the average direction). In some aspects, path management unit 205 may be configured to assign a velocity value to each element in the grid based on the average velocity. The velocity value may be an unscaled value or a scaled value. The velocity value may be a normalized value, for example the average velocity normalized by the maximum, minimum, range, average, or median of the magnitudes of the average velocities for the elements of the grid. In some embodiments, path management unit 205 may be configured to determine a change in average velocity between a first path map and a second path map.

As depicted in exemplary FIG. 4B, user velocity maps may indicate regions of high user velocity, for example high velocity region 409. High velocity regions may be defined with respect to historical velocities or current user velocities. Historical velocities may include maximum velocities over a time interval, average velocities over a time interval, or some other measure of typical velocities known to one of skill in the art. High velocity regions may be defined statistically or with respect to a predetermined threshold. A definition of high velocity regions may be particular to environment 209, or independent of any particular environment. For example, high velocity regions may be defined with respect to a percentile, such as the 75%, 80% or 90% percentile of user velocities for a user velocity map of environment 209. As an additional example, high velocity regions may be defined with respect to an average user velocity and a standard deviation of user velocities, such as a user velocity more than one standard deviation greater than the average user velocity. As a further non-limiting example, a high velocity region may comprise discrete elements with average velocity values greater than 1 meter per second, when environment 209 is, as a non-limiting example, a store. As a further non-limiting example, a high velocity region may comprise discrete elements with user velocities greater than 20 meter per second, when environment 209 is, as a non-limiting example, a road. Particular threshold values may depend on environment 209 and the examples provided are not intended to be limiting. As shown in FIG. 4A, high velocity regions may be associated with user behaviors, such as, in non-limiting examples, first entering a store (e.g., high velocity region 409).

As depicted in exemplary FIG. 4B, user velocity maps may indicate regions of low user velocity, for example low velocity region 407. Low velocity regions may be defined with respect to historical velocities or current user velocities. Historical velocities may include maximum velocities over a time interval, average velocities over a time interval, or some other measure of typical velocities known to one of skill in the art. Low velocity regions may be defined statistically or with respect to a predetermined threshold. A definition of low velocity regions may be particular to environment 209, or independent of any particular environment. For example, low velocity regions may be defined with respect to a percentile, such as the 25%, 20% or 10% percentile of user velocities for a user velocity map of environment 209. As an additional example, low velocity regions may be defined with respect to an average user velocity and a standard deviation of user velocities, such as a user velocity less than one standard deviation less than the average user velocity. As a further non-limiting example, a low velocity region may comprise discrete elements with average velocity values less than 0.1 meter per second, when environment 209 is, as a non-limiting example, a store. As a further non-limiting example, a low velocity region may comprise discrete elements with user velocities less than 2 meter per second, when environment 209 is, as a non-limiting example, a road. Particular threshold values may depend on environment 209 and the examples provided are not intended to be limiting. As shown in FIG. 4A, low velocity regions may be associated with user behaviors, such as, in non-limiting examples, user queuing in front of a service location (e.g., low velocity region 407).

User velocity maps may be associated with metadata, consistent with disclosed embodiments. In some embodiments, path management unit 205 may be configured to generate and provide user velocity maps based on path maps for certain selections of one or more of products, product categories, financial transaction categories (e.g., method of payment, amount of purchase, returns), and users with selected demographic characteristics. As a non-limiting example, a user velocity map may indicate the velocities of users in environment 209 that purchased more than $100 worth of products, or the velocities of 18-to-34-year-old users in environment 209. In some embodiments, path management unit 205 may be configured to provide user density maps as heatmaps for display on an electronic display associated with one or more of user device 201, path management unit 205, and environment 209.

Figure 5:
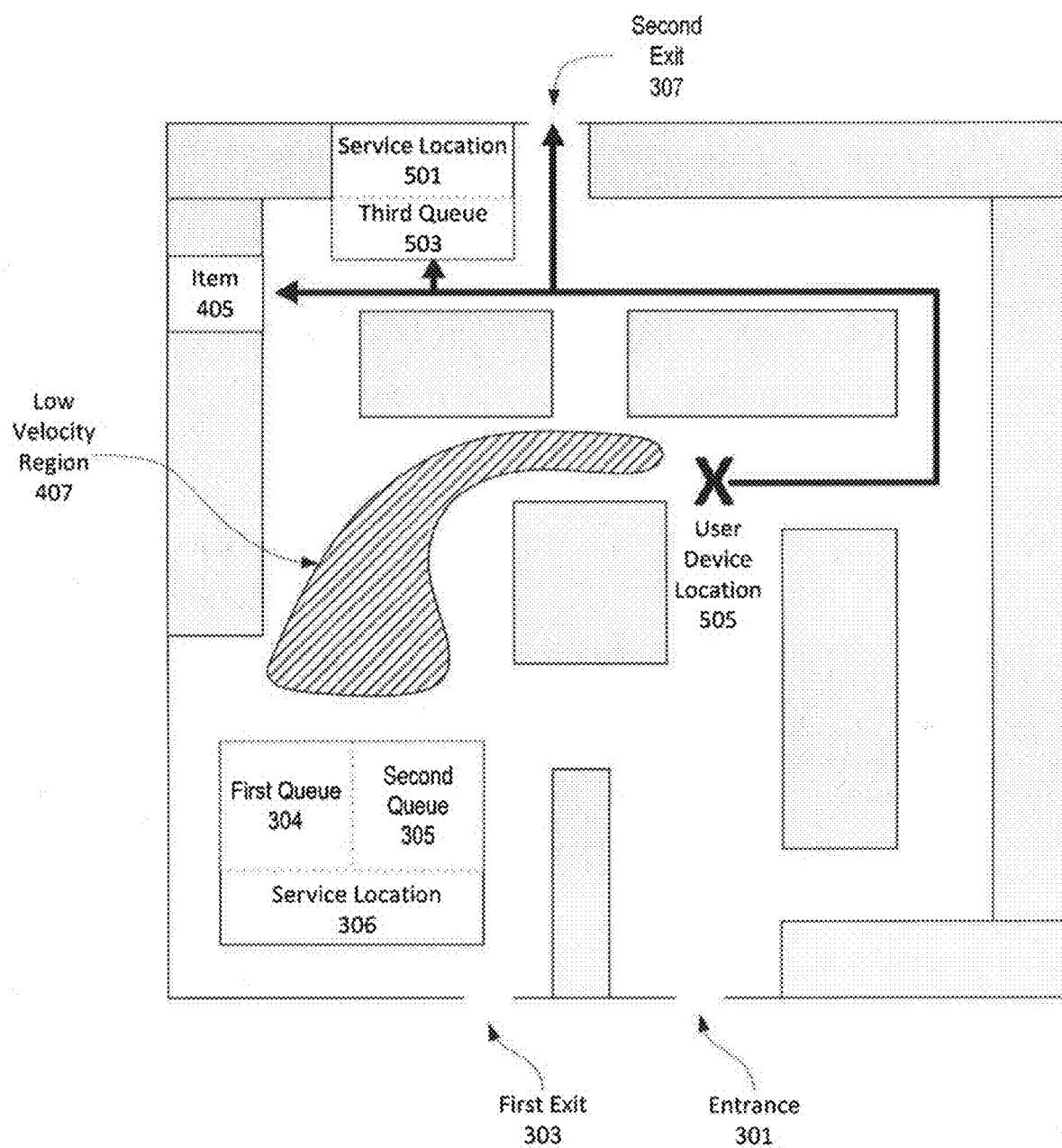
FIG. 5 depicts a schematic of information provided by the exemplary system for path management.

FIG. 5 depicts an exemplary schematic showing exemplary instructions 113 provided by path management system 200, consistent with disclosed embodiments. In some embodiments, path management unit 205 may be configured to receive a request for information from user device 201. In certain aspects, the request may concern one or more of a product type, route, and a service location. For example, path management unit 205 may be configured to receive a request for a service location matching certain criteria (e.g., service location type, wait time, distance from user, or similar characteristics of a service location). Path management unit 205 may be configured to determine, based on one or more of a path map, user density map, and user velocity map, a selection of service locations meeting the selection criteria. For example, path management unit 205 may be configured to determine an expected wait time at a service location based on one or more of user velocities at the service location, individual paths recorded in a path map traversing the service location, and determined correlations between historical measures of user velocity and/or user density and historical wait times. As an additional example, path management unit 205 may be configured to receive a request for a product or product type matching certain criteria. As described above with respect to FIG. 2, path management unit 205 may be configured with product and inventory information for environment 209. Path management unit 205 may be configured to determine one or more products matching the specified criteria.

Consistent with disclosed embodiments, path management unit 205 may be configured to provide instructions 113 responsive to the above-discussed request. In certain aspects, path management unit 205 may be configured to provide instructions 113 to user device 201. For example, when the request concerns a product, or product category, instructions 113 may comprise one or more products satisfying the request criteria. As an additional example, when the request concerns a service location, instructions 113 may comprise one or service locations satisfying the request criteria. In some embodiments, path management unit 205 may be configured to provide a route. In certain aspects, the route may be provided in response to a request for a route. For example, path management unit 205 may be configured to receive a request from user device 201 for a route from a first location. In some aspects, the first location may correspond to a location of the user device 201. In certain aspects, the first location may be specified in the request. In various aspects, the second location may be specified in the request. In some aspects, the second location may correspond to one or more of a product or service location, for example, a product or service location specified in the For example, path management unit 205 may be configured to receive a request from user device 201 for a route from a first location to a second location in environment 209. As an additional example, environment 209 may comprise a road network, and the first location and second location may comprise geographic locations reachable using the road network. As a further example, environment 209 may comprise a store, the first location may comprise a location of user device 201, and the second location may comprise one or more of a product location or a service location. In some embodiments, path management unit 205 may be configured to receive the request for a route in response after providing instructions 113 concerning a requested product, product category, or service location.

Path management unit 205 may be configured to determine a route in response to a received request. In some embodiments, path management unit 205 may be configured to determine the route based on one or more of the path map, density map, and velocity map. For example, as shown in FIG. 5, path management unit 205 may be configured to determine a route from user device location 505 to one or more of item 405, service location 501, third queue 503, or second exit 307. This route may be configured to avoid low velocity region 407. Similarly, path management unit 205 may configure a route to avoid a high density region. In some aspects, path management unit 205 may be configured to determine routes based on paths corresponding to user devices. For example, path management unit 205 may be configured to determine routes based on elapsed times for paths between the paths traversing the beginning and end of the route.

Figure 6:
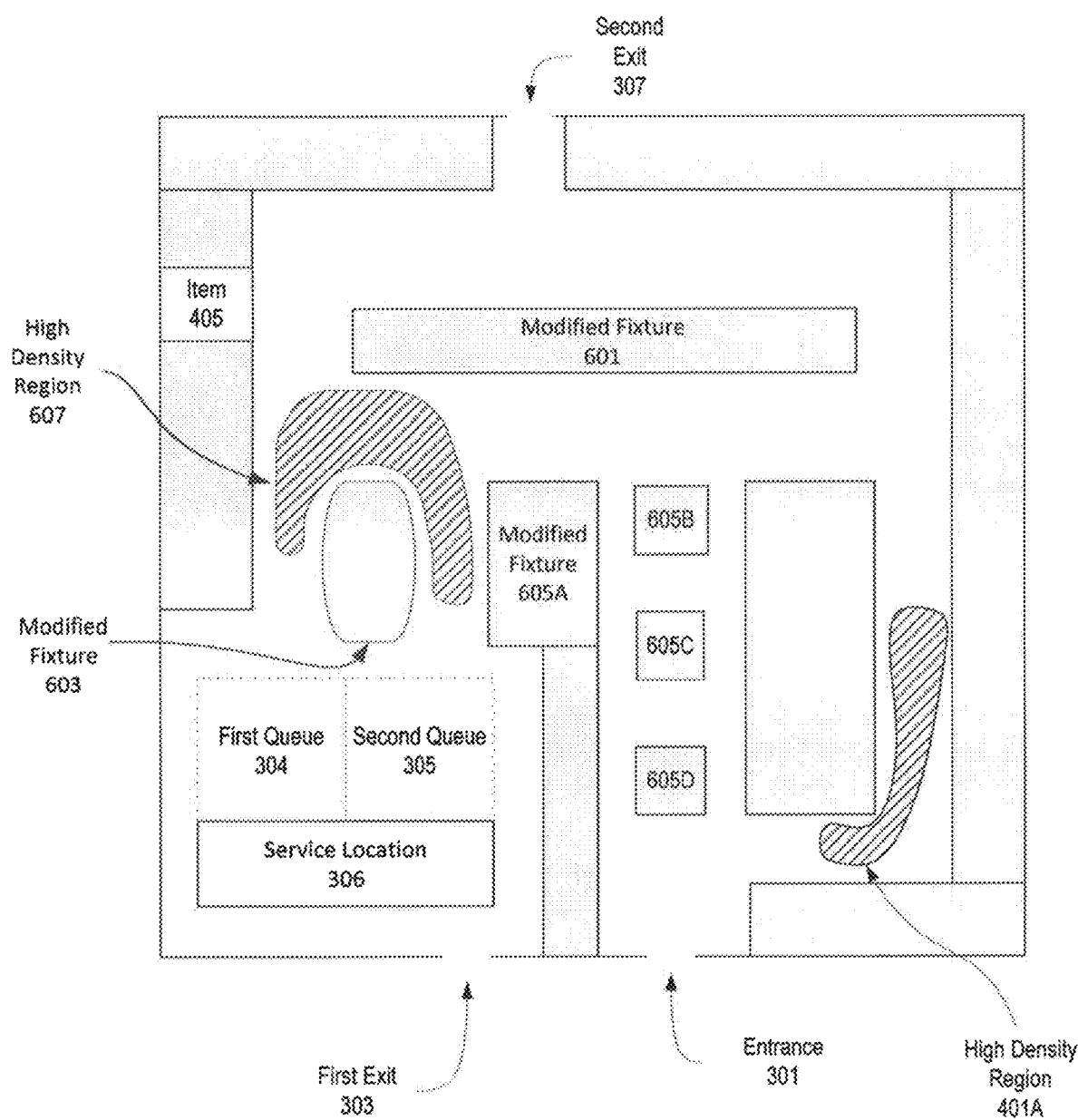
FIG. 6 depicts a schematic illustrating a second path map.

FIG. 6 depicts an exemplary schematic showing exemplary modifications to environment 209 according to instructions 113 provided by path management system 200, consistent with disclosed embodiments. In some embodiments, path management unit 205 may be configured to determine instructions 113 automatically. In certain embodiments, the instructions 113 may comprise instructions to change a status of one or more of a point of service, queue, and staffing level of at least part of a service location. For example, path management unit 205 may be configured to determine when the expected wait time at a service location or queue rises above (or falls below) a predetermined threshold. In some aspects, path management unit 205 may be configured to provide instructions to open additional (or close existing) service locations or queues based on this determination. Similarly, path management unit 205 may be configured to determine whether to increase or decrease the number of personnel at a service location, based on a customer density at the service location. For example, path management system 205 may be configured to detect that a queue at a point of sale exceeds a predetermined wait time and provide instructions to open another register at the point of sale. In some embodiments, path management system 205 may be configured to provide instructions to one or more of the users in the queue, for example through a user device, to move to another point of sale. Path management system 205 may be configured to provide a path to this secondary point of sale. As another example, path management system may be configured to determine, based on one or more of the path map, velocity map, and density map, that customers of a store are wandering the menswear department and provide instructions for dispatching sales associates from another department to assist them.

In some embodiments, path management unit 205 may be configured to provide one or more of instructions to modify a product layout and instructions to modify a fixture arrangement. In some embodiments, path management system 205 may be configured to determine a modified arrangement of fixtures. In certain embodiments, path management system 205 may be configured to provide one or more of a path map, density map, and velocity map to another entity, computer, or program that determine a modified arrangement of fixtures. In some aspects, path management system 205 may be configured to receive instructions 113 from such an entity, computer, or program and convey the instructions 113 to environment 209. The modified arrangement of fixtures may be derived to increase sales or profitability, improve employee or customer satisfaction, improve a safety metric (such as an evacuation time or response time), or other similar metrics known to one of skill in the art. As shown in exemplary FIG. 6, environment 209 may be modified in accordance with instructions 113. For example, environment 209 may be modified to include modified fixtures 601, 603, and 605A-605D. In some embodiments, path management unit 205 may be configured to determine a second path map based on user data 111 received after implementation of instructions 113. For example, as shown in FIG. 6, path management unit 205 may be configured to determine, based on received user data 111, that modified fixtures 605A-605D eliminated high velocity region 409, increasing sales for nearby items; and that low density regions 403A and 403B have been eliminated. But as shown by the second density map, new high density region 607 remains. Based on the determined high density region 607, path management system 205 may be configured to provide additional instructions 113. Thus path management system 200 may enable the iterative, real-time modification of environment 209 to optimize metrics as described above.

Figure 7:
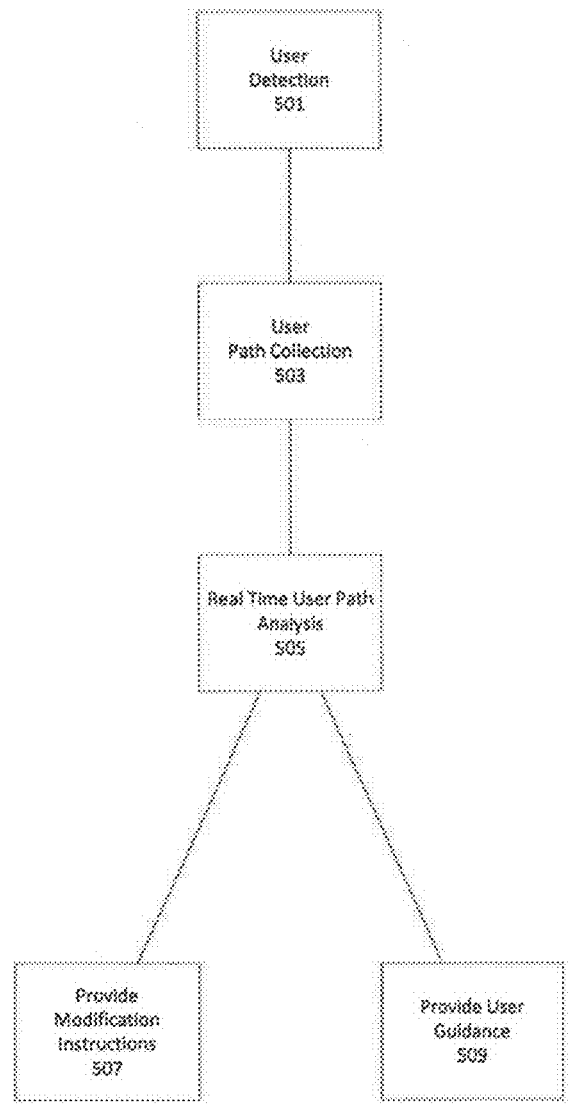
FIG. 7 depicts a flowchart illustrating exemplary operations of a method for path management.

FIG. 7 depicts a flowchart illustrating exemplary operations of a method for path management. In step 501, path management system 200 may be configured to detect a user, consistent with disclosed embodiments. In some embodiments, user device 201 may be configured to broadcast information. For example, user 201A may configure user device 201 to broadcast information using an application running on user device 201. As an additional example, user device 201 may be configured to broadcast information automatically. For example, upon entering environment 209, a BLE enabled application, or a BLE tag may be configured to sense a BLE beacon. In some embodiments, the BLE enabled application, or BLE tag may be configured to alert path management system 200 of the presence of the user device 201. In certain embodiments, the user device may be configured to execute a software application facilitating detection of user device 201 by beacons/receivers 203. In some aspects, such an alert may also alert path management system 200 to the presence of user 201A.

Path management system 200 may be configured to detect a user in step 503, consistent with disclosed embodiments. As described above with respect to FIGS. 2, 3A and 3B, path management system 200 may be configured to periodically receive indications of distance from one or more of user device 201 and beacons/receivers 203. For example, user device 201 may be configured to provide one or more of distance categories, received signal strength indications, estimated distances, and determined user device locations to path management unit 205 based on broadcast beacon signal identifiers. As an additional example, beacons/receivers 203 may be configured to provide one or more of distance categories, received signal strength indications, and estimated distances from user device 201 based on broadcast user device signals. For example, user device 201 may be configured to broadcast signal identifiers. In certain aspects, based on one or more of distance categories, received signal strength indications, and estimated distances, path management unit 205 may be configured to determine locations for user device 205. In various aspects, based on determined and/or received user device locations, path management unit 205 may be configured to determine user paths.

Path management system 200 may be configured to perform real time path analysis in step 505, consistent with disclosed embodiments. As described above, with respect to FIG. 2, path management unit 205 may be configured to determine path maps for environment 209. As further described above, with respect to FIGS. 4A and 4B, in some embodiments, path management unit 205 may be configured to generate a user density map and/or a user velocity map. In some aspects, path management unit 205 may be configured to identify regions of low customer density and/or regions of high customer density. In certain aspects, path management unit 205 may be configured to identify regions of low customer velocity and high customer velocity. In some embodiments metadata may be associated with one or more of the receivers/beacons 203, device locations, paths, path maps, user density maps, and user velocity maps. For example, the receivers/beacons 203, device locations, paths, path maps, user density maps, and user velocity maps may be associated with metadata concerning one or more of a user, such as user 201; a product, such as item 405; and an environment, such as environment 209. In some embodiments, path management unit 205 may be configured to generate one or more of path maps, user density maps, and user velocity maps based on metadata associated with one or more of users, paths, receivers/beacons 203, and device locations. For example, path management unit 205 may be configured to generate path maps specific to demographic categories of users, products or product categories, types of services or service location (e.g., every path in an environment that traverses a specific point of sale), times or periods of time, or other analytic categories that would be recognized by one of skill in the art. In some embodiments, based on one or more of the determined paths, path maps, user density maps, user velocity maps, and associated metadata, path management unit 205 may be configured to determine modification instructions 113, as described above. In certain embodiments, path management unit 205 may be configured to provide one or more of the determined paths, path maps, user density maps, user velocity maps, and associated metadata to another computer system or program to determine modification instructions 113. In some embodiments, path management unit 205 may be configured to receive modification instructions 113 from another computer system or program.

Consistent with disclosed embodiments, in step 507 path management unit 205 may be configured to provide instructions to a computer system associated with environment 209, such as, in a non-limiting example, a computer system for a merchant associated with environment 209. In some embodiments, modification instructions 113 may comprise instructions to change a status of one or more of a point of service, a queue, and a staffing level of at least part of a service location. For example, modification instructions 113 may comprise instructions to activate or deactivate one or more of a point-of-sale, queue, access point, or service location. As an additional example, modification instructions 113 may comprise instructions to increase or decrease a staffing level. In certain embodiments, modification instructions 113 may comprise instructions to modify one or more of a product layout or fixture arrangement.

Consistent with disclosed embodiments, in step 509 path management unit 205 may be configured to provide instructions 113 to a computer system, such as user device 201, associated with a user, such as user 201A. As described above with respect to FIG. 5, in some embodiments, instructions 113 may concern one or more of a route, a product, a product category, and a service location. For example, path management unit 205 may be configured to provide instructions 113 in response to a request. The request may concern one or more of a product, product category, and service location. The request may include request criteria. In certain aspects, instructions 113 may comprise indications of products and/or service locations satisfying the request criteria. In some aspects, the indications may further comprise one or more of a distance, wait time, rating, or other information relevant to the selection of the indicated products, product categories, and/or service locations, as would be recognized by one of skill in the art. In some embodiments, path management unit 205 may be configured to provide indications automatically, based on one or more of a path map, density map, and velocity map. In some embodiments, path management unit 205 may be configured to provide a route. The route may be provided in response to a request. The request may comprise one or more of a first location and a second location. In some embodiments, the first location may comprise the location of a user device, such as user device 201, providing the request. In some aspects, the second location may comprise a location provided in the request. In certain aspects, the second location may comprise the location of a product or service location. In certain aspects, path management unit 205 may be configured to provide a route with a reduced travel time. For example, the reduced travel time may be an optimal travel time, as determined according to one or more of a path map, density map, and velocity map. As an additional example, the route may have a reduced travel time as compared to a naïve route that minimized the distance traveled.

Figure 8:
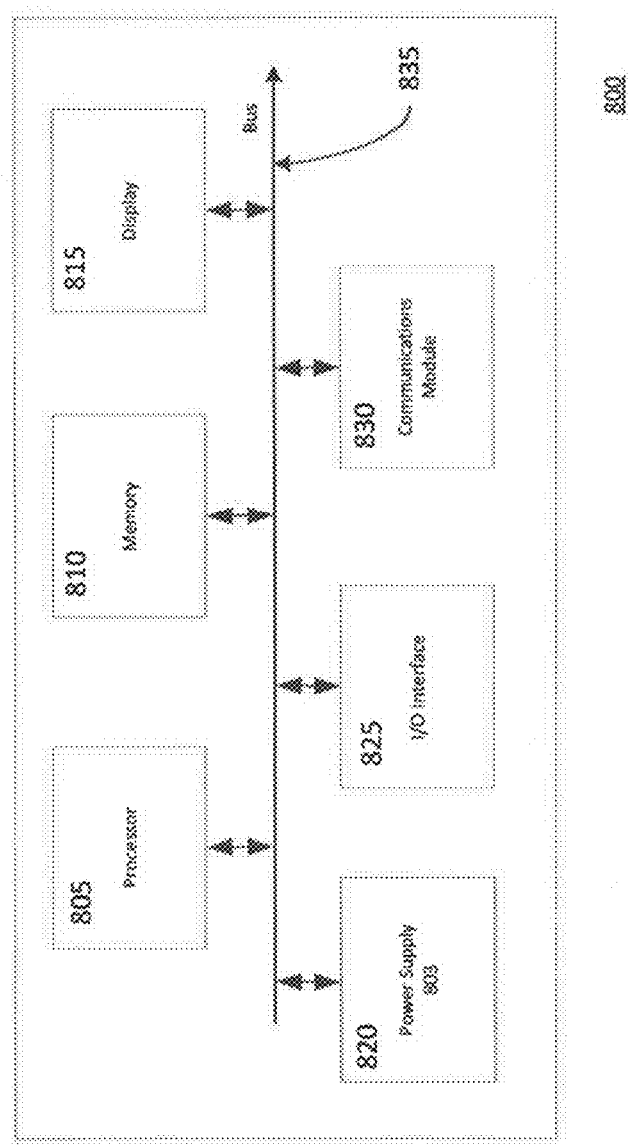
FIG. 8 depicts a schematic of an exemplary component of the system for path management.

FIG. 8 depicts a schematic of an electronic device 800 of path management system 200, consistent with disclosed embodiments. According to some embodiments, electronic device 800 may include a processor 805, memory 810, power supply 820, I/O interface(s) 825, and communication module 830. These units may communicate with each other via bus 835, or wirelessly. The components shown in FIG. 8 may reside in a single device or multiple devices.

Processor 805 may be one or more microprocessors, central processing units, or graphics processing units performing various methods in accordance with disclosed embodiments. Memory 810 may include one or more computer hard disks, random access memory, removable storage, or remote computer storage. Memory 810 may be configured to store software programs executed by processor 805. In some embodiments, electronic device 800 may comprise display 815. Display 815 may comprise one or more of an LED display, LCD display, CRT display, or similar display consistent with disclosed embodiments. In some embodiments, electronic device 800 may comprise power supply 820. In some aspects, power supply 820 may include components for converting mains electricity to voltages and/or currents suitable for use by other components of exemplary component 800. In certain aspects, power supply 820 may comprise an energy storage device, such as a battery, capacitor, or other energy storage device known to one of skill in the art. In some embodiments, electronic device 800 may comprise I/O interfaces 825. I/O interfaces 825 may include keyboard, a mouse, an audio input device, a touch screen, or similar human interface device, consistent with disclosed embodiments. Communications module 830 enables the exemplary device to exchange information with components of FIG. 2 over network 207. In various embodiments, communications module 830 may be configured to support wireless or wired networks. In certain aspects, communications module 830 may be configured with modules for supporting one or more local area networks, personal area networks, Bluetooth networks, RFID networks, and near field networks. As would be recognized by one of skill in the art, in some embodiments, electronic device 800 may include some or all of the components listed in FIG. 8.

Example: Dynamic Queuing

As a non-limiting example of the disclosed embodiments, path management system 200 may be used to dynamically manage queues. In some aspects, the queues may comprise users in an environment such as a store, airport, amusement park ride, or similar venue. In another, queues may comprise all or part of a road in a road network. In some aspects, beacons or receivers in the environment may interact with user devices. For example, the user devices may comprise mobile phones, tablets, BLE beacons or tags, RFID tags, smart clothing or wearable devices. Path management system may be configured to determine one or more of path maps, user density maps, and user velocity maps based on user data generated by the interaction of the beacons or receivers and the user devices. Path management system 200 may be configured to determine wait times, staffing levels for queue, whether queue need be opened or closed, and assignment of user to queues, based on the one or more path maps, user density maps, and user velocity maps. For example, path management system 200 may be configured to determine congestion on a highway network or road and dynamically adjust lane directions, openings, and closure to alleviate congestion.

Though described above with respect to systems for tracking users, one of ordinary skill in the art would recognize the utility of the disclosed embodiments for tracking material goods though production, distribution, and use. For example, path management system 200 may be configured to track the movement of parts through a factory, finished goods through a warehouse, and surgical implements through a surgical unit. As another example, path management system 200 may be configured to track a workflow process.

Example: Retail Environment Management

As a non-limiting example of the disclosed embodiments, path management system 200 may be used to provide instructions and gather data for iteratively updating a retail environment. In some aspects, beacons or receivers in the retail environment may interact with user devices. For example, the user devices may comprise mobile phones, tablets, BLE tags, RFID tags, smart clothing or wearable devices. Path management system may be configured to determine one or more of path maps, user density maps, and user velocity maps based on user data generated by the interaction of the beacons or receivers and the user devices. Path management system may be configured to identify regions of low and/or high customer density, low and/or high customer velocity, and analyze customer buying patterns in real time at level of the individual customer.

Path management system 200 may be configured to provide instructions to the retail environment, and may enable the precise determination of the effect of these modifications on retail sales metrics known to one of skill in the art. For example, path management system 200 may enable more precise measurements of utilization of departments, areas and service locations of a retail environment. As an additional example, path management system 200 may enable precise determination of sales per square foot and similar retail metrics. As an additional example, path management system 200 may be configured to provide automatic management instructions, for example summoning employees to a service location in response to, or in anticipation of, increased customer activity. For example, path management system 200 may summon employees to a department in response to a sudden increase in customer density.

Example: Recommendation Systems

As a non-limiting example of the disclosed embodiments, path management system 200 may be configured to provide recommendations based on one or more of path maps, user density maps, and user velocity maps based on user data generated by the interaction of the beacons or receivers and user devices. For example, path management system 200 may generate a comparison of estimated wait times at service locations based on the gather user data. In some aspects, the service locations may comprise points of sale or queues, or stores in the same franchise or similar categories (e.g., fast food establishments, or coffee shops). Path management system 200 may be configured to provide recommendations to users based on the estimated wait times. In some embodiments, the recommendations may be provided based on, and/or may depend upon, the estimated locations of the users. For example, path management system may be configured to estimate user's goals based on the path history of the user and provide recommendations tailored to the user. For example, path management system may be configured to determine that a user intends to buy a particular product and suggest coupons, alternatives, or complementary products. In some aspects, path management system 200 may be configured to generate the recommendations in response to requests received from user devices. Such recommendations may also enable service providers to engage in load management among multiple service locations.

Example: Personal Navigation Systems

As a non-limiting example of the disclosed embodiments, path management system 200 may be configured to provide routing information to users based on one or more of path maps, user density maps, and user velocity maps based on user data generated by the interaction of the beacons or receivers and user devices. Path management system may be configured to identify regions of low and/or high customer density, low and/or high customer velocity. In some embodiments, routes may be provided in response to user requests. In some embodiments, requests may comprise one or more of a first location and a second location. In some aspects, the first location may comprise a location of a user. In various aspects, the second location may comprise a requested location or a location determined by path management system 200. By using the user density map and the user velocity map, the provided route may avoid chokepoints and congested areas that would otherwise delay the user.

Though described above with respect to systems for providing routes to individual users, one of ordinary skill in the art would recognize the utility of the disclosed embodiments for determining routes for groups of users. For example, the disclosed systems and methods may be used in emergency response planning, either prospectively or reactively. Prospective planning may include determining appropriate emergency routes in an environment based on historical path maps. For example, one or more of path maps, customer density maps, and customer velocity maps may be used to estimate chokepoints, congested areas, and user distributions in the environment during an emergency. Such maps could also identify potentially unsafe areas, such as barriers or confined areas where users might be harmed by overcrowding or panicked crowds. Reactive planning may include providing routes to users during an emergency, and may be determined based on the real time user conditions during the emergency.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A user device comprising:
a memory storing instructions; and
one or more processors configured to execute the instructions to perform operations comprising:
receiving, at the user device from a first beacon, a first signal comprising a first sensor identifier, the first beacon and the user device both being located within the same environment;
measuring a signal strength of the first signal;
generating a request for route information, the request comprising information related to the first signal strength and the first sensor identifier;
transmitting the request to a route management system;
receiving guidance information from the route management system;
generating route information based on the route guidance information; and
displaying the route information, wherein displaying the route information comprises displaying a map of velocity vectors, wherein each vector of the velocity vectors indicates a direction and a magnitude of a velocity.

2. The user device of claim 1, wherein the information related to the first signal strength and the first identifier comprises at least one of a distance from the first beacon or a category of signal strength.

3. The user device of claim 1, wherein the environment is one of a mall, a store, a restaurant, a concert hall, an amusement park, an entertainment venue, a transportation depot, a worksite, a warehouse, or a hospital.

4. The user device of claim 1, wherein the operations further comprise:
receiving a repeat signal from the first beacon;
measuring a signal strength of the repeat signal;
transmitting, to the route management system, a request for updated route information, the request for updated route information comprising a measurement of the repeat signal strength;
receiving, from the route management system, updated guidance information based on the repeat signal strength;
generating updated route information based on the updated guidance information; and
displaying the updated route information.

5. The user device of claim 1, wherein the route guidance information comprises a discretized representation of an environment.

6. The user device of claim 1, wherein displaying the route information comprises displaying a density map.

7. The user device of claim 6, wherein displaying the density map comprises displaying at least one of a route map for a product, a product category, a financial transaction category, or a demographic characteristic.

8. The user device of claim 1, wherein:
the operations further comprise receiving user input; and
generating the request comprises generating a request for route information based on the user input.

9. The user device of claim 1, wherein generating the request comprises automatically generating the request.

10. The user device of claim 1, wherein:
the operations further comprise:
receiving, from a second beacon, a second signal comprising a second sensor identifier;
receiving, from a third beacon, a third signal comprising a third sensor identifier;
measuring a signal strength of the second signal;
measuring a signal strength of the third signal; and
estimating a position of the user device, based on the first signal strength, the second signal strength, and the third signal strength; and
generating the request comprises generating a request for route information based on the position of the user device, the second sensor identifier, and the third sensor identifier.

11. The user device of claim 1, wherein generating the request comprises generating a request for route information, the request comprising at least one of a user profile, a user credential, a user credit history, a user transaction history, or financial data.

12. The user device of claim 1, wherein transmitting the request to a route management system comprises transmitting the request via a network to a remotely located server.

13. The user device of claim 1, wherein the request further comprises at least one of a product, a product category, or a service location.

14. The user device of claim 1, wherein the operations further comprise using an application to broadcast a notification indicating that the user device is in the environment.

15. The user device of claim 1, wherein the request comprises a first location and a second location.

16. The user device of claim 1, wherein the guidance information is based on at least one of a wait time at a queue, a staffing level at a queue, a decision to open or close a queue, or the assignment of the user device to a queue.

17. The user device of claim 1, wherein the route information comprises a definition of an emergency route, based on real time conditions during the emergency.

18. The user device of claim 1, wherein the user device comprises at least one of a mobile phone, a tablet, a Bluetooth Low Energy beacon or tag, a radio frequency identification tag, an article of smart clothing, or a wearable device.

19. A method for path guidance comprising:
receiving, by a user device, from a first beacon, a first signal comprising a first sensor identifier, the first beacon and the user device both being located within the same environment;
measuring, by the user device, a signal strength of the first signal;
generating, by the user device, a request for route information, the request comprising information related to the first signal strength and the first sensor identifier;
transmitting by the user device, the request to a route management system;
receiving, by the user device, guidance information from the route management system;
generating, by the user device, route information based on the route guidance information; and
displaying, by the user device, the route information, wherein displaying the route information comprises displaying a map of velocity vectors, wherein each vector of the velocity vectors indicates a direction and a magnitude of a velocity.

20. A system for path management within an environment, the system comprising:

one or more processors configured to execute the instructions to perform operations comprising:
- receiving, from a beacon, a signal indicating a location of a user device;
- receiving from the user device a request for route information, the request comprising information related to the location of the user device;
- providing instructions for modifying a condition of the environment based on a density map associated with other user devices, wherein modifying conditions of the environment includes at least one of changing a status of a point of a service provided by the store, changing a status of a queue, changing a staffing level of at least part of the store, modifying a layout of the store, or modifying a product layout within the store;
- providing to the user device guidance information based on:
  - the density map; and
  - the instructions for modifying the condition of the environment.

\* \* \* \* \*